United States Patent [19]
Focke et al.

[11] Patent Number: 5,582,282
[45] Date of Patent: Dec. 10, 1996

[54] APPARATUS FOR THE TRANSPORT OF STACKS OF BLANKS

[75] Inventors: Heinz Focke; Martin Stiller, both of Verden, Germany

[73] Assignee: Focke & Co. (GmbH & Co.), Verden, Germany

[21] Appl. No.: 574,895

[22] Filed: Dec. 19, 1995

Related U.S. Application Data

[63] Continuation of Ser. No. 151,375, Nov. 12, 1993, abandoned.

[30] Foreign Application Priority Data

Nov. 11, 1992 [DE] Germany ............... 42 37 937.7

[51] Int. Cl.$^6$ ................................................ B65G 1/00
[52] U.S. Cl. ............................. 198/347.1; 198/809
[58] Field of Search ................... 198/457, 426, 198/429, 809, 418.1, 448, 817

[56] References Cited

U.S. PATENT DOCUMENTS

| | | | |
|---|---|---|---|
| 3,756,374 | 9/1973 | Burt et al. | 198/809 X |
| 4,109,781 | 8/1978 | Moons | 198/457 X |
| 4,256,222 | 3/1981 | Gunti | 198/457 |
| 4,273,234 | 6/1981 | Bourgeois | 198/809 X |
| 4,666,030 | 5/1987 | Okada et al. | 198/457 X |
| 4,993,915 | 2/1991 | Berger et al. | |
| 5,201,403 | 4/1993 | Haas, Sr. et al. | 198/347.1 X |
| 5,220,994 | 6/1993 | Jenkner | 198/457 X |

FOREIGN PATENT DOCUMENTS

| | | |
|---|---|---|
| 273288 | 7/1988 | European Pat. Off. . |
| 3247563 | 6/1984 | Germany . |
| 4024451 | 2/1991 | Germany . |
| 4024450 | 2/1991 | Germany . |
| 4001051 | 7/1991 | Germany . |
| 2005211 | 4/1979 | United Kingdom . |
| 2041311 | 9/1980 | United Kingdom . |
| 2107690 | 5/1983 | United Kingdom . |

*Primary Examiner*—D. Glenn Dayoan
*Attorney, Agent, or Firm*—Sughrue, Mion, Zinn, Macpeak & Seas

[57] ABSTRACT

An apparatus for transporting of stacks of blanks (10) to packaging machines, the stacks of blanks (10) are delivered on pallets (11). Rows of stacks (12) are transferred from the pallets (11) to a stack conveyor (15) which leads to the packaging machine. In order to supplement the flow of transport during interruptions, at least one additional conveyor (18, 24) is provided which is loaded with stacks of blanks (10) by hand and which supplies them as required. The additional conveyor (18, 24) is movable up and down. In the lower feeding position, upright separating webs (10) take effect which serve for facilitating the accurate positioning of the stacks of blanks (10) on the additional conveyor (18, 24).

11 Claims, 3 Drawing Sheets

APPARATUS FOR THE TRANSPORT OF STACKS OF BLANKS

This is a continuation of application Ser. No. 08/151,375, filed Nov. 12, 1993 abandoned.

BACKGROUND OF THE INVENTION

The invention relates to an apparatus for the transport of stacks of blanks, especially for the production of cigarette packs of the hinge-lid type, the stacks of blanks which are lying next to one another being capable of being fed to a packaging machine or to another unit.

Blanks for hinge-lid packs are normally delivered as prefabricated stacks of blanks, mostly in rows and superimposed layers on pallets. During unloading of the pallets, usually rows of stacks of blanks are lifted off the pallet and deposited onto a conveyor band (stack conveyor). The stacks of blanks are fed to the packaging machine or a blank magazine from said stack conveyor, To the stack conveyor, a preconveyor (row conveyor) is often assigned, onto which the row of stacks of blanks is deposited by a lift means, and which feeds the complete row transversely relative to its longitudinal dimension to the stack conveyor as described in U.S. Pat. No. 4,993,915—Berger et al whose disclosure is incorporated herein by reference.

The invention is based on the object of further developing and improving aparatuses of this kind, to the effect that the operation of the subsequent packaging machine can be maintained at least for a limited time, even if the supply of stacks of blanks to the stack conveyor is interrupted.

In order to attain this object, the apparatus according to the invention is characterized in that at least one separate conveyor for stacks of blanks, namely an additional conveyor is assigned to the stack conveyor, by means of which individual stacks or a plurality of stacks of blanks can be fed to the stack conveyor as required.

The apparatus according to the invention is thus designed so that stacks of blanks can be channeled into the conveying process as required. This is required, above all, if the apparatus for the discharge of the stacks of blanks from the pallet or the like temporarily breaks down.

One or two additional conveyors may immediately adjoin the stack conveyor and/or preconveyor on its free side.

Further important features of the invention are auxiliary devices for the facilitated feed of the additional conveyor with stacks of blanks. For this purpose, the additional conveyor can be moved, especially lowered, into a feeding position. In the region of the feeding position, separating walls or separating webs take effect on a conveyor strand of the additional conveyor which is designed as a conveyor band, the separating webs permitting an accurate arrangement of the stacks of blanks on the additional conveyor. An exemplary embodiment of the invention is explained in more detail below with reference to the drawings. In these

DESCRIPTION OF PREFERRED EMBODIMENTS

Figure 1:
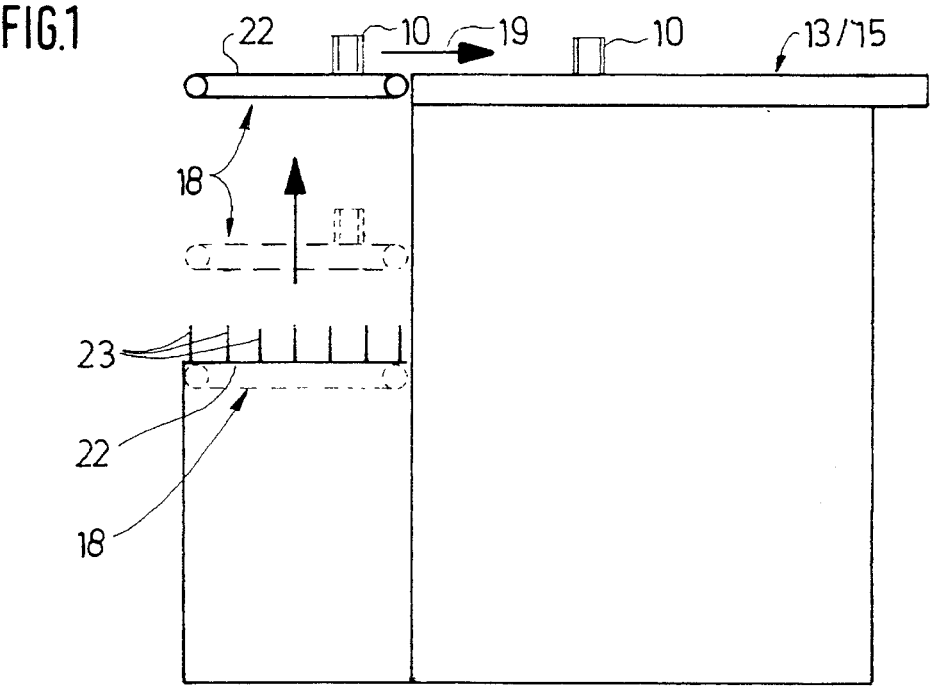
Fig. 1 shows a diagrammatic side view of an apparatus with additional conveyor.

The exemplary embodiments illustrated in the drawings show, in a very schematic manner, an apparatus for the handling of stacks of blanks (10). The blanks serve for the production of hinge-lid packs for cigarettes. The blanks are manufactured outside of the region of the packaging and are delivered as stacks of blanks (10). In the present embodiment, the stacks of blanks are located on a pallet 11. The stacks of blanks 10 are arranged in superimposed layers forming adjoining rows of stacks 12, as in the apparatus according to U.S. Pat. No. 4,993,915.

The stacks or blanks are taken off row by row from the pallet 11 by a lift means. In this respect as well, the apparatus can be designed according to the example of U.S. Pat. No. 4,993,915. A complete row of stacks 12 is lifted each time by the lift means and deposited onto the preconveyor 13. Alternatively, it is also possible to lift only parts of the row of stacks and introduce them into the subsequent conveying process.

The preconveyor 13 conveys the row of stacks 12 as a unit in the direction of the arrow 14 onto a subsequent conveyor, namely a stack conveyor 15. The stack conveyor 15 gradually, namely according to the requirements of a subsequent packaging machine, conveys the stacks of blanks 10 in the direction of the arrow 16. At the end of the stack conveyor 15, the blanks can be deposited onto a further conveyor or onto an intermediate conveyor. In the present exemplary embodiment, the stack of blanks 10 which respectively lies in the front relative to the direction of transport of the stack conveyor 15, is pushed off, for example into a blank magazine of the packaging machine. This pushing-off movement is illustrated by the arrow 17.

Figure 5:
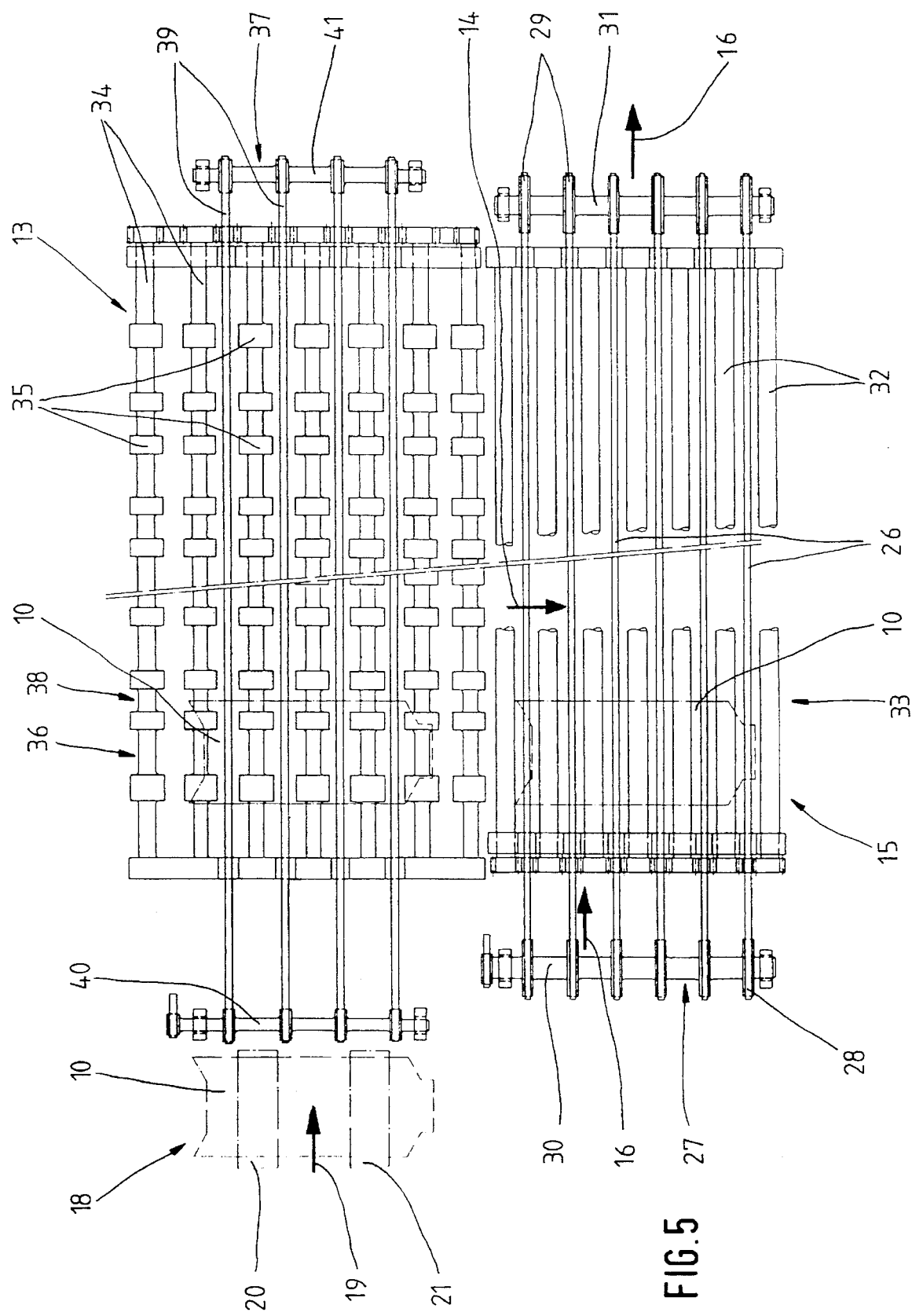
FIG. 5 shows a detail of the apparatus according to Figs. 1 and 2 in the region of a preconveyor and a stack conveyor, in a view analogous to FIG. 2.

The stack conveyor 15 is appropriately designed as a conveyor band comprising at least one belt 26 (FIG. 5). The belts 26 of the conveyor band form a transverse conveying system 27 which engages and conveys the stacks of blanks 10 in the direction of the arrow 16. The belts 26 are guided along deflecting rollers 28, 29 which are each mounted rotatably on a common shaft 30, 31. The actuation of the shafts 30, 31 can be switched over, so that the stacks of blanks 10 can be transported in the direction of the arrow 16 as well as in the opposite direction. Additionally, the stack conveyor 15 comprises elongated conveying rods or transporting rollers 32. The transporting rollers 32 extend approximately parallel to one another, The transporting rollers 32 from a longitudinal conveying system 33 and support the transport of the row of stacks 12 in the direction of the arrow 14 from the preconveyor 13 onto the stack conveyor 15. The transporting rollers 32 have a common actuation. In order to ensure the interplay of the transverse and longitudinal conveying system of the stack conveyor 15, the transverse conveying system, especially the belts 26, are vertically adjustable i.e., are movable up and down.

For the transport of the row of stacks in the direction of the arrow 14, the belts 26 are moved out of engagement with the stacks. The belts 26 release the transporting rollers 32 which then ensure the transport of the stacks of blanks 10 in the direction of arrow 14.

The preconveyor 13 may—as in the apparatus according to U.S. Pat. No. 4,993,915—be designed as a broad conveying belt. Advantageous, however, is a preconveyor made of a plurality of transporting wheels, especially transporting rollers which are transversely placed in relation to the conveying direction. These transporting rollers 34 which are appropriately rotatably actuated transport the row of stacks 12 onto the stack conveyor 15. If accordingly designed, parts of the row of stacks 12 or individual stacks of blanks 10 can also be transported. The transporting rollers 34 extend approximately parallel to one another having swellings 35 located at a distance of one another between which recesses 36 are formed. This design is of interest for the transport of the stacks of blanks 10 from the pallet 11 onto the preconveyor 13. Claws of the lifting conveyor (not shown) engage with the recesses 36 during the discharge of a row of stacks 12 onto the preconveyor 13. The stacks of blanks 10 rest on the swellings 35.

Figure 2:
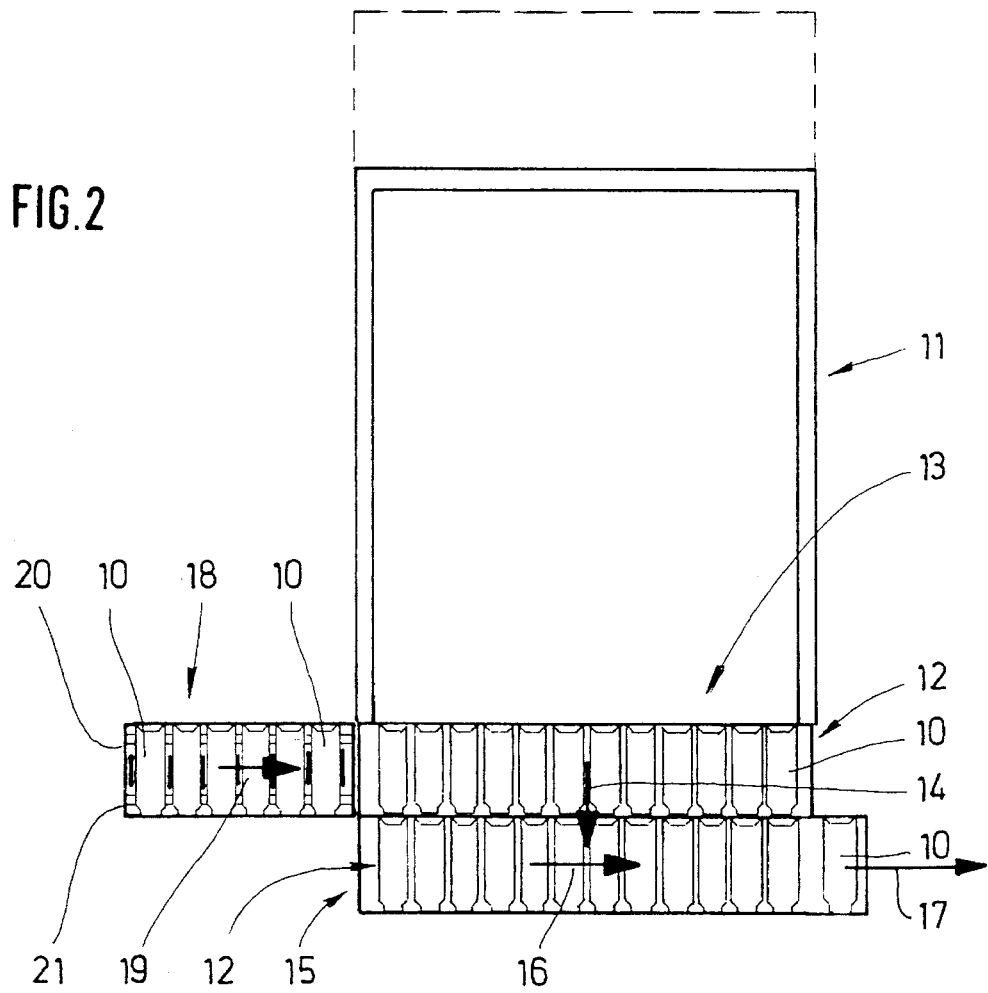
FIG. 2 shows a diagrammtic ground plan of the apparatus according to Fig. 1.

A separate conveyor, namely an additional conveyor 18 (FIGS. 1, 2 and 5), is assigned to the conveying apparatus for stacks of blanks 10 as described in the foregoing, This additional conveyor 18 serves for the introduction of additional stacks of blanks into the conveying process. For this purpose, the additional conveyor 18 is arranged in extension of the preconveyor 13 or besides it. The stacks of blanks 10 are positioned on the additional conveyor so that they constitute an extension of a row of slacks 12 on the preconveyor 13. If required, the stacks of blanks 10 are transported from the additional conveyor 18 onto the preconveyor in the direction of the arrow 19, said preconveyor 13 transporting said stacks of blanks 10 onto the stack conveyor 15. Such an additional requirement may occur, for example, when an emptied pallet 11 is replaced by a new, loaded pallet. During the interruption of the feed of stacks of blanks 10, these are supplied by the additional conveyor by transferring them to the preconveyor 13. Therefore, the preconveyor 13, as well as the stack conveyor 15, comprises a transverse conveying system 37 and a longitudinal conveying system 38. The longitudinal conveying system 38 is formed by the transporting rollers 34 and interacts with the longitudinal conveying system 33 of the stack conveyor 15. The transverse conveying system 37 of the preconveyor 13 is, in principle, constructed in the same way as the transverse conveying system 27 of the stack conveyor 15. It is composed of belts 39 which are guided along deflecting rollers 40, 41. During the transport of the stacks of blanks 10 from the additional conveyor 18 onto the preconveyor 13, the belts 39 of the preconveyor 13 are moved upwards into a plane above the transporting rollers 34. The belts 39 take over the stacks of blanks 10 from the conveyor belts 20, 21 of the additional conveyor, and deposit them onto the transporting rollers after having shifted them transversely.

Figure 3:
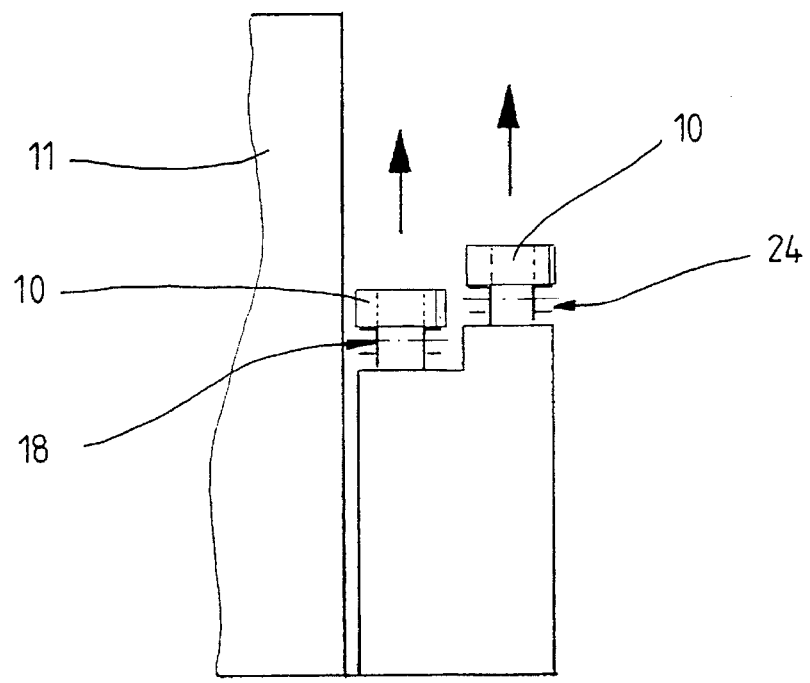
FIG. 3 shows a diagrammatic side view of a section of an apparatus comprising additional conveyors according to a second embodiment.
Figure 4:
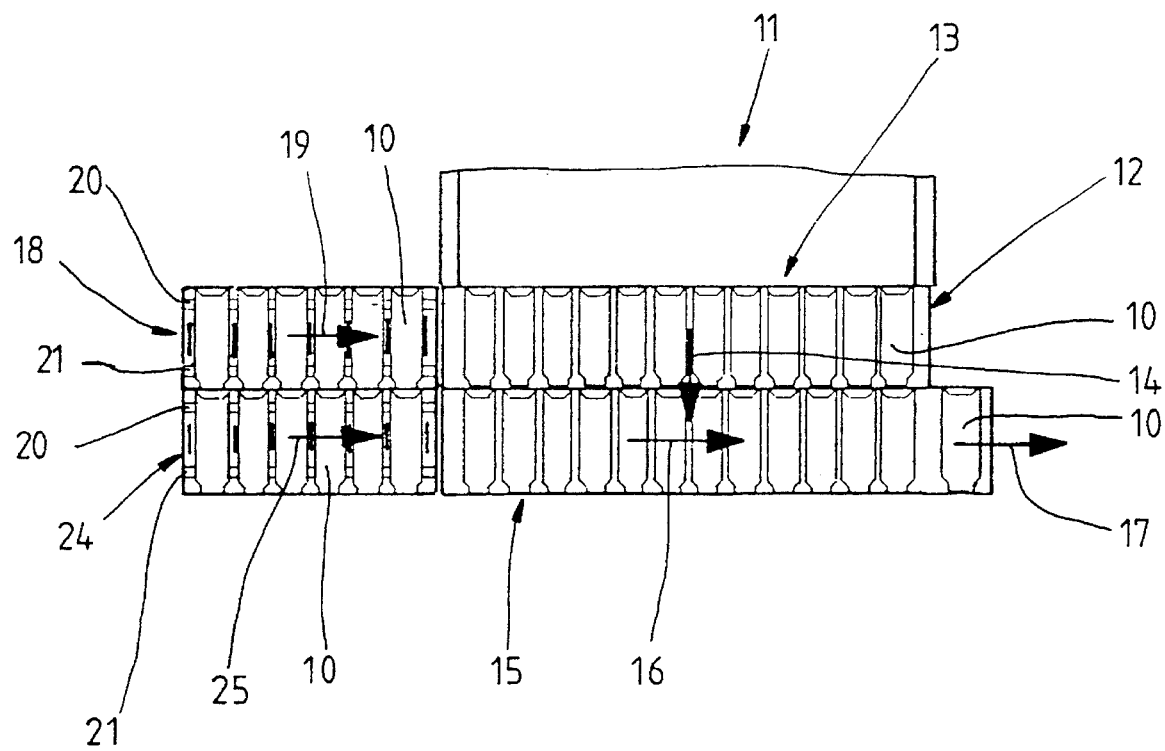
FIG. 4 shows a diagrammatic ground plan of the apparatus according to FIG. 3.

According to the exemplary embodiment of FIGS. 3 and 4, a second additional conveyor 24 is assigned to the conveying apparatus described above. This second additional conveyor 24 is arranged immediately next to the stack conveyor 15 and also serves for the introduction of additional stacks of blanks 10 into the conveying process. if required, stacks of blanks 10 are transported in the direction of the arrow 25 onto the stack conveyor 15.

The additional conveners 18, 24 in the present exemplary embodiment are designed as conveyor bands, in fact having two conveyor belts 20, 21 arranged at a distance from one another. A stack of blanks 10 rests on an upper strand 22.

The feeding of the additional conveners 18, 24 is appropriately carried out by hand. For this purpose, the additional conveners 18, 24 can be moved, in the present case lowered, into a feeding position. In the lower feeding position (FIG. 3 or dotted representation in FIG. 1) the members for the facilitated positioning of the stacks of blanks 10 on the additional conveyor 18, 24 take effect. These members are upright separating walls or separating webs 23. These separating webs 23 are in the present case arranged stationary and directed upwards. During the lowering of the (emptied) additional conveyor 18, 24, the accordingly dimensioned separating webs 23 reach through in the region between the conveying belts 20, 21 and project beyond the plane of the upper strand with their upper side. The stacks of blanks 10 are then positioned (by hand) between the neighbouring separating webs 23. Also by means of the separating webs 23, the accurate distance between the stacks of blanks 10 for further transportation is maintained. During the upward movement of the loaded additional conveyor 18, 24, said additional conveyor is relieved from the separating webs 23.

The additional conveyor 18, 24 can also be employed as a store for stacks of blanks 10 which have been separated out of the conveying flow described above during possible temporary interruptions in the region of the packaging machine, or due to other reasons. In this case, a row of stacks 12 or a part of same is transferred from the preconveyor 13 or stack conveyor 15 to the additional conveyor 18, 24 driven in the corresponding direction. In order to carry out this laterally directed conveying movement for the stack of blanks 10, the preconveyor 13 or stack conveyor 15 comprises corresponding conveying means. If the preconveyor 13 or stack conveyor 15 is comprised of transport wheels or transport rollers arranged at a distance from one another, the transversely directed conveying means, for example the belts which are movable up and down, may be arranged between the conveying rollers The belts are lifted for the transport of the stacks of blanks 10 in the direction of the additional conveyor 18 above the plane of the preconveyor 13 or stack conveyor 15, so that the stacks of blanks 10 can be taken over by the belts and can be transported in the direction of the additional conveyor 18, 24.

The apparatus can also be modified to the effect that only one additional conveyor 24 takes effect immediately, in the region of the stack conveyor 15.

What is claimed is:

1. In an apparatus for transporting stacks (10) of blanks to a packaging machine for the production of cigarette packs of the hinge-lid type, first stacks (10) of said blanks lying next to one another, the apparatus comprising a stack conveyor (15) for conveying the stacks in a transport direction to the packaging machine, and a preconveyor (13) for receiving the stacks and for delivering the stacks to the stack conveyor in a direction transverse to said transport direction, the improvement wherein the apparatus further comprises:

a first additional conveyor (18, 24) for delivering additional stacks of blanks to said stack conveyor (15) or to said preconveyor (13), located upstream of the stack conveyor (15) in the direction of transport, as required for an uninterrupted transport of stacks to the packaging machine; and a transverse stack-conveying system (37) located in a region of said preconveyor (13);

wherein said transverse conveying system (37) comprises a horizontal conveyor band having at least one belt (39), and wherein said belt (39) is operable alternately in opposite conveying directions and is vertically adjustable.

2. In an apparatus for transporting stacks of blanks (10) to a packaging machine for the production of cigarette packs of the hinge-lid type, first stacks of said blanks (10) lying next to one another, the apparatus comprising a stack conveyor (15) for conveying the stacks in a transport direction to the packaging machine, and a preconveyor (13) for receiving the stacks and for delivering the stacks to the stack conveyor in a direction transverse to said transport direction, the improvement wherein the apparatus further comprises:

first and second additional conveyors (18, 24) for selectively and respectively delivering to said stack conveyor (15) and to said preconveyor (13), located upstream of said stack conveyor (15) in said transport direction, at least one additional stack of blanks as required for uninterrupted transport of stacks by said stack conveyor to the packaging machine; and a compartment system of stack-separating webs (23) which is associated with each of said additional conveyors (18, 24), and which is separable from said additional conveyors, for providing separating walls for accurate manual positioning of stacks of blanks (10) on said additional conveyors (18, 24).

3. The apparatus according to claim 2, wherein each additional conveyor (18, 24) is lowerable into a feeding position in which the separating webs (23) form said walls in a region of an upper strand (22) of each additional conveyor (18, 24) in accordance with a distance between the additional stacks of blanks (10).

4. The apparatus according to claim 3, wherein each additional conveyor (18, 24) comprises a belt conveyor having two conveying belts (20,21) located at a distance from one another, the separating webs (23) projecting through the conveyor belts (20, 21) to form said walls in said feeding position.

5. An apparatus for the transporting in a transport-direction stacks of blanks (10) to a packaging machine for the production of cigarette packs of the hinge-lid type, said apparatus comprising:

a) only a single stack conveyor on which is successively deposited a plurality of stacks (10) of blanks in the transport direction and at a distance from one another, and which successively feeds the stacks (10)to the packaging machine, b) only a single preconveyor (13) which adjoins said single stack conveyor, which is disposed upstream of said stack conveyor (15), and onto which a group of stacks of blanks (10) is fed from a source in the same relative direction as the stacks (10) on said stack conveyor (15), c) said single preconveyor (13) being adapted to feed all stacks deposited thereon to said stack conveyor (15) transversely to the transport direction in one conveying cycle, d) said single preconveyor (13) and said single adjoining stack conveyor (15) feeding the packaging machine with stacks (10) of blanks, depending on requirements of the packaging machine; and e) a first additional conveyor (18, 24) which is adjacent to one of said preconveyor (13) and said stack conveyor (15), and on which a group of additional stacks (10) of blanks is manually deposited in a relative position corresponding to the stacks (10) on said preconveyor (13) or said stack conveyor (15), f) wherein said additional conveyor (18, 24) extends at a level of said preconveyor (13) or said stack conveyor (15) on a side opposite to a discharge side of said stack conveyor (15), and g) wherein, in case of a temporary interruption of the feed of the stacks (10) from said source to said preconveyor (13), said additional conveyor (18, 24) feeds the additional stacks (10) deposited thereon to said preconveyor (13) or said stack conveyor (15).

6. An apparatus for the transporting in a transport-direction stacks of blanks (10) to a packaging machine for the production of cigarette packs of the hinge-lid type, said apparatus comprising:

a) only a single stack conveyor on which is successively deposited a plurality of stacks (10) of blanks in the transport direction and at a distance from one another, and which successively feeds the stacks (10) to the packaging machine;

b) only a single preconveyor (13) which adjoins said single stack conveyor, which is disposed upstream of said stack conveyor (15), and onto which a group of stacks of blanks (10) is fed from a source in the same relative direction as the stacks (10) on said stack conveyor (15), c) said preconveyor (13) being adapted to feed all stacks deposited thereon to said stack conveyor (15) transversely to the transport direction in one conveying cycle, d) said single preconveyor (13) and said single adjoining stack conveyor (15) feeding the packaging machine with stacks (10) of blanks, depending on requirements of the packaging machine; and e) a first additional conveyor (18, 24) which is adjacent to one of said preconveyor (13) and said stack conveyor (15), and on which a group of additional stacks (10) of blanks is manually deposited in a relative position corresponding to the stacks (10) on said preconveyor (13) or said stack conveyor (15), f) said preconveyor (13) and said stack conveyor (15) being disposed at an upper level relative to a lower feed level of said additional conveyor (18, 24), g) said additional conveyor (18, 24) being movable up and down between said lower feed level, for manually feeding stacks (10) and an upper transfer level, said lower feed level of said additional conveyor (18, 24) being below a conveying plane of said preconveyor (13) and said stack conveyor (15), and h) wherein, in case of a temporary interruption of the feed of the stacks (10) from said source to said preconveyor (13), said additional conveyor (18, 24) feeds the additional stacks (10) deposited thereon to said preconveyor (13) or said stack conveyor (15).

7. The apparatus as claimed in claim 5 or 6, further comprising a second additional conveyor (24), said first and second additional conveyors (18, 24) being separably driven and being arranged parallel next to one another and adjoining the preconveyor (13) and the stack conveyor (15), respectively.

8. The apparatus according to claim 5 or 6, wherein said additional conveyor (18, 24) has a separable compartment system of separating webs (23) for providing accurate manual positioning of the stacks (10) on the additional conveyor (18, 24), and wherein one respective stack is depositable between adjacent separating webs (23) in a lower feeding position of said additional conveyor.

9. The apparatus as claimed in claim 8, wherein said additional conveyor (18, 24) is a belt conveyor comprising two conveyor belts (20, 21) located at a distance from one another, and wherein the separating webs (23) of the compartment system, in the lower feeding position of said additional conveyor, are located between said conveyor belts (20, 21).

10. The apparatus as claimed in claim 5 or 6, wherein said additional conveyor (18, 24) is drivable in two opposite conveying directions such that stacks of blanks (10) are feedable from said additional conveyor (18, 24), alternatively, to said preconveyor (13) or said stack conveyor (15), or such that stacks can be received by said additional conveyor (18, 24) from said preconveyor (13) or said stack conveyor.

11. An apparatus for the transporting in a transport-direction stacks of blanks (10) to a packaging machine for the production of cigarette packs of the hinge-lid type, said apparatus comprising:

a) a stack conveyor on which is successively deposited a plurality of stacks (10) of blanks in the transport direction and at a distance from one another, and which successively feeds the stacks (10) to the packaging machine;

b) a preconveyor (13) which adjoins said stack conveyor, which is disposed upstream of said stack conveyor (15), and on which a group of stacks of blanks (10) is deposited in the same relative direction as the stacks (10) on said stack conveyor (15), c) said preconveyor (13) being adapted to feed all stacks deposited thereon to said stack conveyor (15) transversely to the transport direction in one conveying cycle; and d) an additional conveyor (18) which is adjacent said preconveyor and onto which a group of stacks (10) is deposited manually in a relative position corresponding to the stacks (10) on the preconveyor, the stacks (10) deposited on said additional conveyor (18) being feedable to said preconveyor (13) transversely to the transport direction;

e) wherein said preconveyor (13) comprises a longitudinal conveying system (38) for the transport of the stacks from said preconveyor (13) to said stack conveyor (15), and a transverse conveying system for the transport of the stacks (10) from said additional conveyor (18) onto said preconveyor (13); and f) wherein said longitudinal conveying system (38) comprises a plurality of parallel transport rollers (34), and wherein said transverse conveying system (37) comprises a plurality of parallel belts (39) which extend between adjacent ones of said transport rollers (34), said belts (39) of said transverse conveying system (37) being movable from a position below a conveying plane of said transport rollers (34) into a transport plane above said transport rollers (34) for the transport of stacks from said additional conveyor (18) onto said preconveyor (13).

* * * * *